United States Patent
Matsunaga

(10) Patent No.: US 9,509,668 B2
(45) Date of Patent: Nov. 29, 2016

(54) CONTENT DISTRIBUTION METHOD, CONTENT DISTRIBUTION SYSTEM, SOURCE DEVICE, AND SINK DEVICE

(71) Applicant: Panasonic Intellectual Property Management Co., Ltd., Osaka (JP)

(72) Inventor: Shigeki Matsunaga, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/922,563

(22) Filed: Oct. 26, 2015

(65) Prior Publication Data

US 2016/0044004 A1 Feb. 11, 2016

Related U.S. Application Data

(62) Division of application No. 14/397,874, filed as application No. PCT/JP2014/000860 on Feb. 19, 2014, now Pat. No. 9,203,813.

(30) Foreign Application Priority Data

Mar. 15, 2013 (JP) ................................ 2013-053706

(51) Int. Cl.
*H04L 29/06* (2006.01)
*H04L 29/08* (2006.01)
(Continued)

(52) U.S. Cl.
CPC ........... *H04L 63/0428* (2013.01); *G06F 21/10* (2013.01); *H04L 9/0844* (2013.01);
(Continued)

(58) Field of Classification Search
CPC ..... G06F 21/10; H04L 63/061; H04L 63/08; H04L 67/02

USPC .................................................. 713/168, 171
See application file for complete search history.

(56) References Cited

U.S. PATENT DOCUMENTS 7,246,263 B2 7/2007 Skingle
7,681,238 B2 3/2010 Plastina et al.
(Continued)

FOREIGN PATENT DOCUMENTS

EP         2 000 915     12/2008
JP       2007-096801      4/2007
(Continued)

OTHER PUBLICATIONS

Extended European Search Report issued Mar. 14, 2016 in corresponding European Application No. 14765475.0.
(Continued)

*Primary Examiner* — Haresh N Patel
(74) *Attorney, Agent, or Firm* — Wenderoth, Lind & Ponack, L.L.P.

(57) ABSTRACT

Provided is a content distribution method which allows a source device to safely distribute copyrighted content to a sink device in response to a request from the sink device as a trigger. The content distribution method includes a list transmission step S11, a content request step S12, and a content transfer step S13. In S11, a source device transmits metadata which includes a format identifier indicating that content is distributable under the specification of the HDCP and the URL of the content. In S12, a sink device makes a request for content identified by the URL after adding information necessary for authentication processing to the request. In S13, the source device creates an encryption key by performing the authentication processing on the sink device in accordance with the information necessary for the authentication processing, encrypts the content using the encryption key, and transfers the encrypted content to the sink device.

4 Claims, 9 Drawing Sheets

(51) Int. Cl.

| | | |
|---|---|---|
| *G06F 21/10* | (2013.01) | |
| *H04N 21/4363* | (2011.01) | |
| *H04N 21/4627* | (2011.01) | |
| *H04N 21/835* | (2011.01) | |
| *H04L 9/08* | (2006.01) | |
| *H04N 21/4367* | (2011.01) | |
| *H04N 21/4408* | (2011.01) | |

(52) U.S. Cl.
CPC ............ *H04L63/061* (2013.01); *H04L 63/08* (2013.01); *H04L 67/02* (2013.01); *H04N 21/4363* (2013.01); *H04N 21/4367* (2013.01); *H04N 21/4408* (2013.01); *H04N 21/4627* (2013.01); *H04N 21/835* (2013.01); *G06F 2221/0724* (2013.01); *H04L 2209/605* (2013.01)

(56) References Cited

U.S. PATENT DOCUMENTS

| | | | |
|---|---|---|---|
| 7,716,240 B2 | 5/2010 | Lim | |
| 7,779,097 B2 | 8/2010 | Lamkin et al. | |
| 8,234,387 B2 | 7/2012 | Bradley et al. | |
| 8,335,855 B2 | 12/2012 | Skingle | |
| 8,990,574 B1* | 3/2015 | Priyadarshi | H04L 63/0823 713/176 |
| 9,094,191 B2* | 7/2015 | Avanzi | H04L 9/0822 725/25 |
| 2004/0199604 A1 | 10/2004 | Dobbins et al. | |
| 2004/0199667 A1 | 10/2004 | Dobbins | |
| 2006/0020794 A1* | 1/2006 | Oh | G11B 20/00 713/168 |
| 2006/0075120 A1 | 4/2006 | Smit | |
| 2006/0161635 A1 | 7/2006 | Lamkin et al. | |
| 2006/0265508 A1 | 11/2006 | Angel et al. | |
| 2007/0039055 A1 | 2/2007 | Plastina et al. | |
| 2007/0074293 A1 | 3/2007 | Ushimaru | |
| 2007/0147609 A1* | 6/2007 | Noguchi | H04N 7/1675 380/201 |
| 2007/0157287 A1 | 7/2007 | Lim | |
| 2007/0195077 A1* | 8/2007 | Hwang | G09G 5/006 345/204 |
| 2007/0204161 A1 | 8/2007 | Isozaki et al. | |
| 2007/0296656 A1* | 12/2007 | Lin | G09G 5/006 345/87 |
| 2008/0050097 A1* | 2/2008 | Takamori | G09G 5/006 386/263 |
| 2008/0060051 A1 | 3/2008 | Lim | |
| 2008/0114861 A1 | 5/2008 | Gildred | |
| 2008/0127312 A1* | 5/2008 | Iwamoto | G11B 20/00086 726/4 |
| 2008/0133782 A1* | 6/2008 | Kwon | H04L 41/22 710/19 |
| 2008/0222703 A1* | 9/2008 | Mantani | H04L 9/3271 726/3 |
| 2008/0252782 A1* | 10/2008 | Komeno | G09G 5/12 348/512 |
| 2008/0288618 A1 | 11/2008 | Vardi et al. | |
| 2009/0100147 A1 | 4/2009 | Igarashi | |
| 2009/0222514 A1 | 9/2009 | Igarashi | |
| 2009/0263102 A1* | 10/2009 | Shimada | G11B 20/00086 386/252 |
| 2010/0008504 A1* | 1/2010 | Nagara | H04N 21/43632 380/243 |
| 2011/0246621 A1 | 10/2011 | May et al. | |
| 2011/0282934 A1* | 11/2011 | Chalana | G06Q 10/06 709/203 |
| 2011/0289317 A1* | 11/2011 | Darapu | H04N 21/25816 713/168 |
| 2012/0023240 A1* | 1/2012 | Kwon | H04N 21/4367 709/227 |
| 2012/0072525 A1 | 3/2012 | Yevmenkin et al. | |
| 2012/0182481 A1* | 7/2012 | Hattori | H04N 7/163 348/723 |
| 2012/0265853 A1 | 10/2012 | Knox et al. | |
| 2012/0311626 A1 | 12/2012 | Usui et al. | |
| 2012/0315017 A1 | 12/2012 | Matsushita et al. | |
| 2013/0031208 A1 | 1/2013 | Linton et al. | |
| 2013/0047178 A1 | 2/2013 | Moon et al. | |
| 2013/0047180 A1 | 2/2013 | Moon et al. | |
| 2013/0117444 A1* | 5/2013 | Sharma | G06Q 10/06 709/224 |
| 2013/0198771 A1* | 8/2013 | Kito | H04N 21/4143 725/25 |
| 2013/0227074 A1 | 8/2013 | Odlund et al. | |
| 2013/0275759 A1 | 10/2013 | Isozaki et al. | |
| 2014/0150011 A1 | 5/2014 | Ohno et al. | |
| 2014/0351477 A1* | 11/2014 | Lee | G06F 1/1632 710/303 |

FOREIGN PATENT DOCUMENTS

| | | |
|---|---|---|
| JP | 2007-235246 | 9/2007 |
| JP | 2009-507274 | 2/2009 |
| JP | 2010-239376 | 10/2010 |
| JP | 5029037 | 9/2012 |
| JP | 2013-015937 | 1/2013 |
| WO | 2007/021833 | 2/2007 |

OTHER PUBLICATIONS

International Search Report issued Apr. 8, 2014 in International Application No. PCT/JP2014/000860.

* cited by examiner

FIG. 7

```
———— Open information on content (metadata) ————
<?xml version="1.0"?>
<DIDL-Lite>
    <item id="video_item_1" parentID="AllVideo">
        <dc:title> documentary theater 1 </dc:title>
        <dc:date>2007-05-05T19:00:00</dc:date>
        <res protocolinfo="http-get:*:application/x-dtcp1;DTCP1HOST=192.168.2.2;DTCP1PORT=60080;CONTENTFORMAT="video/vnd.dlna.mpeg-tts":*"
            duration="01:09:09.645" size="7156137792">
            http://192.168.2.2:5555/video/video1.tts</res>
        <res protocolinfo="http-get:*:application/x-panahdcp2;CONTENTFORMAT="video/vnd.dlna.mpeg-tts":*"
            duration="01:09:09.645" size="7156137792">
            http://192.168.2.2:5555/video/video1.tts</res>
        <upnp:class>object.item.videoitem</upnp:class>
    </item>
    ・・・<omission>・・・
</DIDL-Lite>
```

FIG. 8

```
┌─────────────HTTP GET header─────────────┐
GET /video/video1.tts HTTP/1.1
User-Agent: Abc iOS VR-CP UPnP/2.0
Host: 192.168.2.2:5555
X-ABC-HDCP-ADDR: 192.168.2.3
X-ABC-HDCP-PORT: 6666
X-ABC-HDCP-ID:  002D44556600011
```

CONTENT DISTRIBUTION METHOD, CONTENT DISTRIBUTION SYSTEM, SOURCE DEVICE, AND SINK DEVICE

TECHNICAL FIELD

The present disclosure generally relates to a content distribution method, a content distribution system, and a source device and a sink device in the content distribution system and, more particularly, to a method for distributing content while protecting copyright for the content.

BACKGROUND ART

When digital content protected by copyright protection (hereinafter, referred to as "copyrighted content" or also simply referred to as "content") is distributed via a communication network (hereinafter, also simply referred to as "network"), a protocol called digital transmission content protection over Internet protocol (DTCP-iP) is generally used as a copyright protection technology for a network (e.g., Patent Literature 1).

The DTCP-IP is a protocol for transmitting copyrighted content protected by a copyright protection technology such as digital rights management (DRM), and is achieved by applying, to an IP network, a DTCP as a copyright protection technology implemented in a communication standard such as IEEE1394. The DTCP-IP is used for transmitting copyrighted content between devices which are compliant with the guidelines of the digital living network alliance (DLNA) widely used as one of home networks for interconnecting and associating an audio video (AV) device, a personal computer, and other home appliances.

CITATION LIST

Patent Literature

[PTL 1] Japanese Patent No. 5,029,037

SUMMARY OF INVENTION

Technical Problem

However, processing based on a particular copyright protection technology is performed on copyrighted content, depending on a broadcast standard or disk standard. Thus, the DTCP-IP has the following problem. Copyrighted content received in digital television broadcasting or copyrighted content read from a disk such as a digital versatile disk (DVD) cannot be transferred between devices.

Meanwhile, high-bandwidth digital content protection (HDCP) 2.0 has been newly standardized which develops, in a network, the copyright protection technology also employed in the high-definition multimedia interface (HDMI (registered trademark)). The standardization of the HDCP 2.0 allows copyrighted content to be distributed more relatively freely than before.

The HDCP is one of copyright protection technologies. In the HDCP, a video played in a personal computer (PC) or others is encrypted in a path through which a signal is transmitted and received between a reproduction device and a display device such as a display, thereby preventing copyrighted content from being illegally copied. A video in a DVD, digital television broadcasting, or others is protected by encrypting the video. Thus, even if the video is copied, the copied video cannot be played. However, when the video is played in a PC or others and transmitted to a display, the encryption is decrypted. Also in such a case, the HDCP is important in encrypting data. The HDCP 2.0 is a standard achieved by expanding the HDCP limited so far to a wire transmission line such as the HDMI into a wireless network such as a wireless LAN.

Thus, a protocol compliant with the HDCP 2.0 is expected to be employed as a method for distributing copyrighted content obtained from, for example, a DVD or digital television broadcasting, conveniently and safely at any place.

However, the HDCP is designed and standardized, supposing that the HDCP is applied to a protocol under which a source device which transmits copyrighted content transfers a video to a sink device. Meanwhile, the HDCP is not expected to be applied to a protocol under which the source device streams copyrighted content to the sink device, in response to a request from the sink device as a trigger. Thus, simple use of the HDCP has the following problem. It is difficult to achieve an application triggered by the sink device in which the sink device requests the source device to transmit copyrighted content to be reproduced and receives and reproduces the copyrighted content from the source device.

In view of the above problems, the present disclosure provides, for example, a content distribution method which allows a source device to safely distribute copyrighted content to a sink device in response to a request from the sink device as a trigger.

Solution to Problem

To achieve the above object, an aspect of a content distribution method in the present disclosure is a content distribution method in a system in which a source device for transmitting content and a sink device for reproducing the content are connected via a communication network. The content distribution method includes: transmitting metadata from the source device to the sink device, the metadata representing a list of content items held by the source device; receiving the metadata by the sink device, and requesting, by the sink device, a content item included in the list of content items represented by the metadata; transferring the content item requested by the sink device from the source device to the sink device; and receiving and reproducing, by the sink device, the content item transferred from the source device. In the transmitting, the source device transmits the metadata which includes a format identifier and a uniform resource locator (URL) for a content item protected by a predetermined copyright protection technology, among the content items included in the list, the format identifier indicating that the content item is distributable under the copyright protection technology, the URL indicating a place where the content item is stored. In the receiving and requesting, the sink device makes a request for a content item identified by the URL, the request including information necessary for performing authentication processing. In the transferring, the source device creates an encryption key by performing the authentication processing on the sink device in accordance with the information necessary for performing the authentication processing, encrypts the content item requested by the sink device using the encryption key, and transfers the encrypted content item to the sink device. In the receiving and reproducing, the sink device decrypts the encrypted content item transferred from the source device, using the encryption key created in the authentication processing by the source device, to reproduce a decrypted content item.

It should be noted that the present disclosure can be achieved as a content distribution system including a source device for transmitting content and a sink device for reproducing the content which are connected via a network. The present disclosure can be also achieved as the source device or the sink device included in such a content distribution system. The present disclosure can be also achieved as a program which causes a computer to execute a procedure in the content distribution method, processed by the source device or the sink device. The present disclosure can be also achieved as a computer-readable recording medium such as a DVD storing thereon such a program.

Advantageous Effects of Invention

The content distribution method and others in the present disclosure allow a source device to safely distribute copyrighted content to a sink device in response to a request from the sink device as a trigger.

This enables various distribution forms while protecting copyright for content. The present disclosure has a significant meaning since digital content is nowadays more widely available.

BRIEF DESCRIPTION OF DRAWINGS

FIG. 7 is an example of metadata illustrating a content list transmitted in the list transmission step in FIG. 5.

FIG. 8 is a figure for explaining the details of a content request step in FIG. 5.

DESCRIPTION OF EMBODIMENTS

The following describes the embodiment of a content distribution method, a content distribution system, a source device, and a sink device in the present disclosure with reference to the drawings. It should be noted that the figures are schematic diagrams and not necessarily precisely drawn.

Moreover, the embodiment below describes a specific example of a content distribution method, a content distribution system, a source device, and a sink device in the present disclosure. The numerical values, structural elements, the arrangement and connection of the structural elements, and others shown in the following embodiment are mere examples, and do not limit the content distribution method, the content distribution system, the source device, and the sink device in the present disclosure. Moreover, among the structural elements in the embodiment below, the structural elements not recited in the independent claims are considered as optional structural elements.

[1. Configuration of System]

Figure 1:
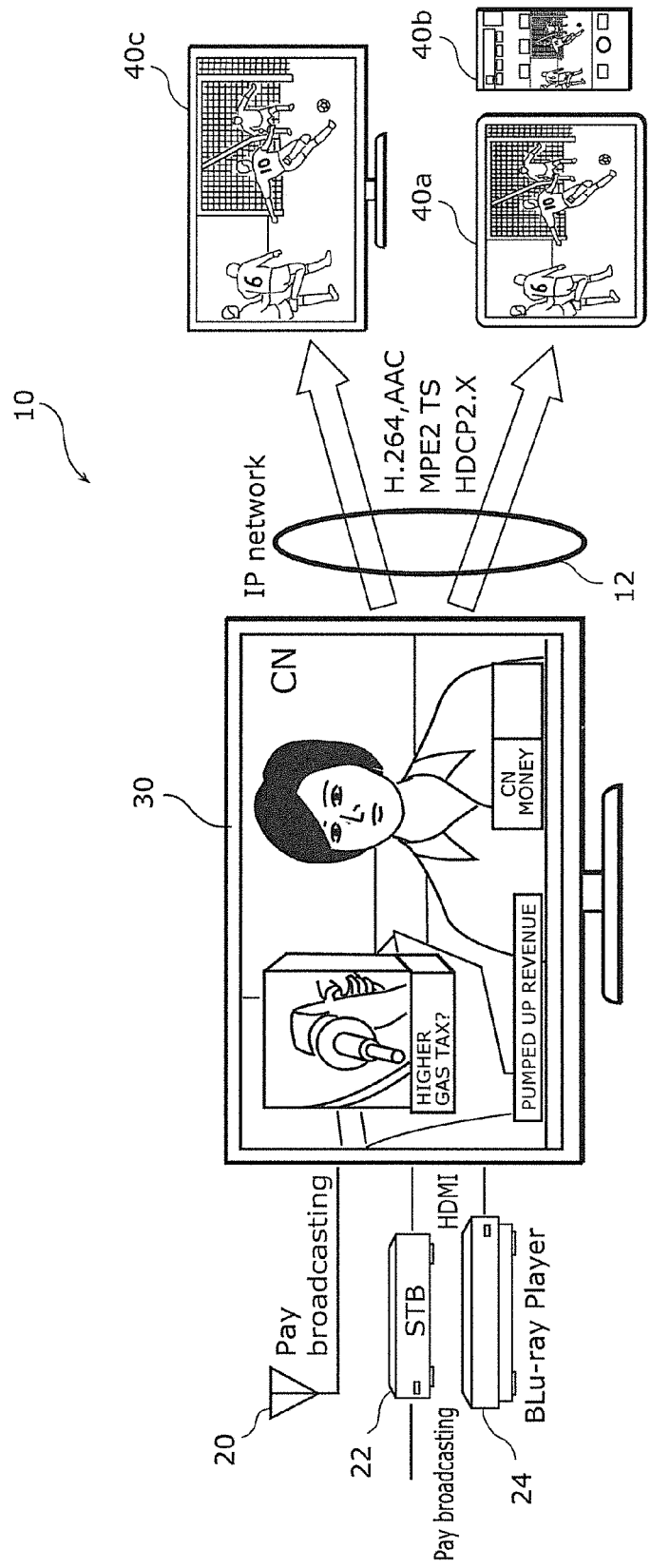
FIG. 1 illustrates the overview of a content distribution system in the embodiment.

FIG. 1 illustrates the overview of a content distribution system 10 in the embodiment of the present disclosure. In the content distribution system 10, a source device 30 for transmitting content and sink devices 40a to 40c for reproducing the content are connected via a network 12. It should be noted that the content distribution system 10 distributes not only copyrighted content but also non-copyrighted content, i.e., content not under copyright protection. However, the following mainly focuses on distribution of copyrighted content to explain the features of the content distribution system 10.

The source device 30 transmits copyrighted content to the sink devices 40a to 40c in response to requests from the sink devices 40a to 40c. The copyrighted content include, for example, pay broadcast content transmitted via an antenna 20, pay broadcast content transmitted from a set top box (STB) 22, and reproduction content transmitted via the HDMI from a disk reproduction device 24 such as a Blu-ray (registered trademark) player. For instance, the source device 30 is a television receiver or a PC.

The sink devices 40a to 40c request the source device 30 to transmit content to be reproduced, in response to user's instruction, and reproduce the content received from the source device 30. The sink devices 40a to 40c are, for example, televisions, tablet terminals, or smartphones (multi-functional cellular phones). It should be noted that in FIG. 1, the three sink devices 40a to 40c are connected with the source device 30 via the network 12. However, the number of sink devices is not limited to three.

The network 12 is just an example of communication network (here, IP network), and is, for example, a wireless LAN compliant with the standard of IEEE 802.11, as a physical layer.

In this content distribution system 10, in response to requests from the sink devices 40a to 40c as triggers, the source device 30 can safely transmit copyrighted content to the sink devices 40a to 40c in accordance with the specification of the HDCP. Here, the copyrighted content is obtained from, for example, digital television broadcasting or a Blu-ray (registered trademark) disc.

It should be noted that the HDCP is an example of a copyright protection technology for preventing content from being illegally copied by encrypting the content using an encryption key created through authentication of a device and transferring the encrypted content from a source device to a sink device. The present embodiment specifies HDCP 2.1, for example.

[1-1. Functional Configuration]

Figure 2:
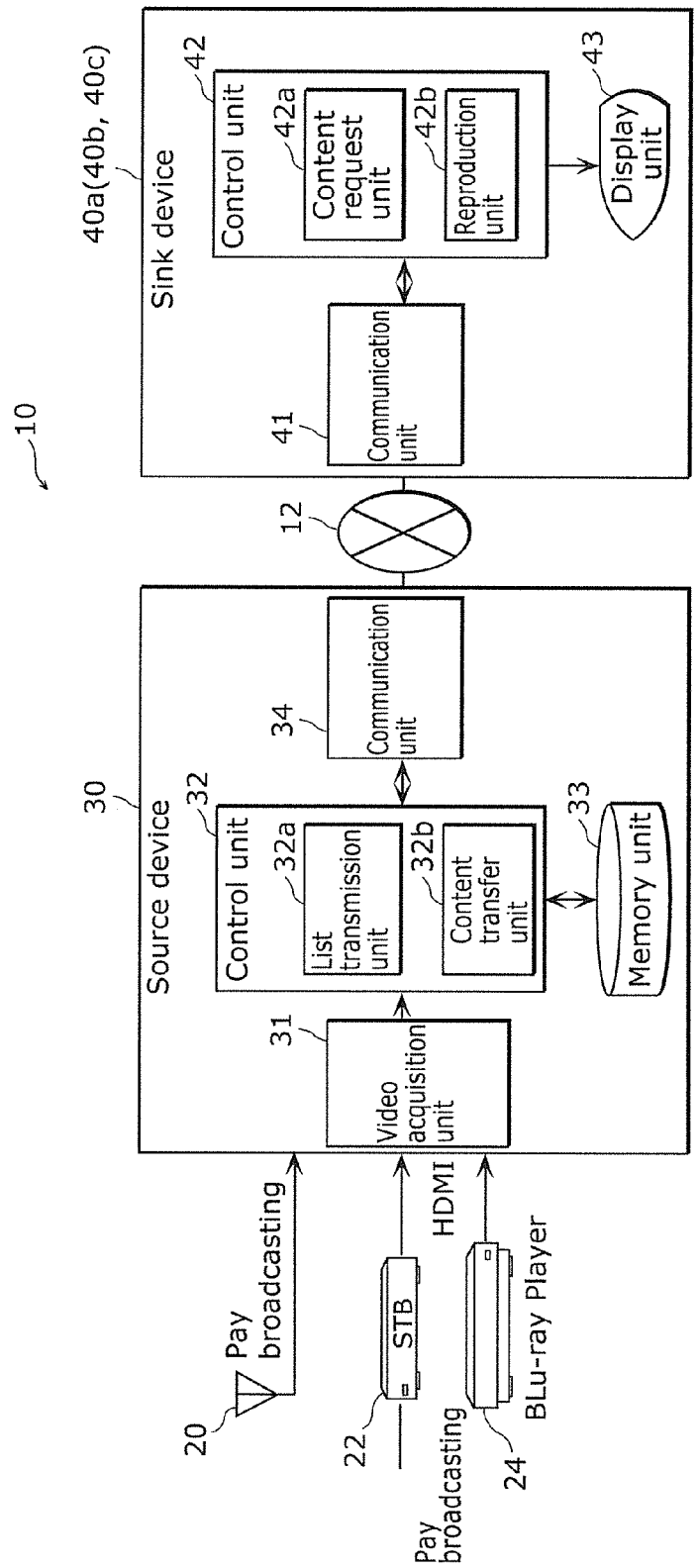
FIG. 2 is a functional block diagram of a source device and a sink device illustrated in FIG. 1.

FIG. 2 is a functional block diagram of the source device 30 and the sink devices 40a to 40c illustrated in FIG. 1. Here, the following describes the functional configuration of the source device 30 and the sink devices 40a to 40c which is achieved by the hardware and software configurations of the source device 30 and the sink devices 40a to 40c which will be described later. It should be noted that the three sink devices 40a to 40c illustrated in FIG. 1 have the same function as the sink devices in the content distribution system 10. Thus, the following focuses on the function of the sink device 40a.

The source device 30 functions as a server compliant with a home network protocol. More specifically, the source device 30 functions as a digital media server (DMS) compliant with the DLNA guidelines. The source device 30 includes a video acquisition unit 31, a control unit 32, a memory unit 33, and a communication unit 34.

The video acquisition unit 31 is a processing unit for acquiring copyrighted content. In the present embodiment, the video acquisition unit 31 acquires pay broadcast content from the antenna 20 or the STB 22 or acquires, via the HDMI, content read from a Blu-ray (registered trademark) disc by the disc reproduction device 24. Then, the video acquisition unit 31 stores the acquired content in the memory unit 33 or transfers the acquired content to the sink device 40*a* via the control unit 32 and the communication unit 34. It should be noted that if the video acquisition unit 31 stores the content in the memory unit 33, the video acquisition unit 31 creates information indicating a list of content items to be stored in the memory unit 33 (a content list), and stores the list in the memory unit 33, together with the content.

The control unit 32 is a processing unit which controls the structural elements (the video acquisition unit 31, the memory unit 33, and the communication unit 34) or interacts with a user via, for example, a remote control or a button. The control unit 32 includes a list transmission unit 32*a* and a content transfer unit 32*b*.

The list transmission unit 32*a* is a processing unit for transmitting, to the sink device 40*a*, metadata representing a list of content items held by the source device 30 (content stored in the memory unit 33 and content which can be acquired by the video acquisition unit 31). More specifically, the list transmission unit 32*a* transmits metadata which includes a format identifier and a uniform locator (URL) for a content item under the HDCP copyright protection (i.e., a copyrighted content item) among the content items included in the list. Here, the format identifier indicates that the content item is distributable under the HDCP. The URL is information indicating the place where the content item is stored.

The content transfer unit 32*b* is a processing unit for transferring content requested by the sink device 40*a* to the sink device 40*a*. More specifically, the content transfer unit 32*b* creates an encryption key by performing authentication processing on the sink device 40*a* in accordance with the specification of the HDCP, encrypts the content requested by the sink device 40*a*, using the created encryption key, and transfers the encrypted content to the sink device 40*a*.

Specifically, the content transfer unit 32*b* performs the authentication processing on the sink device 40*a*, using the IP address of the sink device 40*a* and the port number of the sink device 40*a* used for performing the authentication processing, which are provided by the sink device 40*a* requesting the content. Then, the content transfer unit 32*b* stores, in the memory unit 33, the created encryption key and a session ID provided by the sink device 40*a* which are associated. If the session ID provided by the sink device 40*a* requesting the content matches a session ID previously held by the source device 30, the content transfer unit 32*b* omits the authentication processing on the sink device 40*a* or performs less complex authentication processing and causes the source device 30 and the sink device 40*a* to share the encryption key, to transfer the encrypted content to the sink device 40*a*. This is to speed up access to the source device 30 by the sink device 40*a* when the sink device 40*a* fast forwards content or plays content after a pause, that is, when the sink device 40*a* repeats obtaining content held by the source device 30 in a short period of time.

The memory unit 33 stores the content held by the source device 30 and various parameters (e.g., the session ID described above).

The communication unit 34 is a processing unit for communicating with the sink device 40*a* via the network 12.

The sink device 40*a* functions as a client compliant with a home network protocol, more specifically, as a digital media player (DMP) compliant with the DNLA guidelines. The sink device 40*a* includes a communication unit 41, a control unit 42, and a display unit 43.

The communication unit 41 is a processing unit for communicating with the source device 30 via the network 12.

The control unit 42 is a processing unit for controlling the structural elements (the communication unit 41 and the display unit 43) or interacting with a user via, for example, a remote control or a button. The control unit 42 includes a content request unit 42*a* and a reproduction unit 42*b*. For instance, the control unit 42 creates the content list of content items stored by the source device 30, from metadata received from the list transmission unit 32*a* of the source device 30, and outputs the content list to the display unit 43. Here, if the user selects a particular content item from the content list, the control unit 42 instructs the content request unit 42*a* and the reproduction unit 42*b* to reproduce the particular content item.

The content request unit 42*a* is a processing unit which fetches, in response to user's instruction to reproduce content, a URL indicating the place where the content is stored, from metadata corresponding to the content and requests the source device 30 to transmit the content uniquely indicated by the URL. The content is requested by, for example, issuing a GET method in the hyper text transfer protocol (HTTP) for the URL. Here, if it is written in the metadata that the content instructed to be reproduced is protected by a copyright protection technology, the content request unit 42*a* makes a request for the content after adding, to the request, necessary information according to the type of the copyright protection technology. For instance, if the copyright protection technology is the HDCP 2.0, the content request unit 42*a* requests the content by specifying, in an HTTP request header, the IP address of the sink device 40*a* and the port number of the sink device 40*a* used for performing the above authentication processing, and issuing an HTTP GET method. Here, if the authentication processing has been completed between the source device 30 and the sink device 40*a* and the sink device 40*a* holds a session ID corresponding to the authentication processing, the content request unit 42*a* specifies the session ID held by the sink device 40*a* in the HTTP header when issuing the HTTP GET method corresponding to the content. This allows the source device 30 to check from the session ID whether or not the authentication processing has been performed on the sink device 40*a*. If it is confirmed that the authentication processing has been performed on the sink device 40*a*, the source device 30 and the sink device 40*a* can share an encryption key in a short period of time by omitting the authentication processing on the sink device 40*a* or performing less complex authentication processing.

It should be noted that in the above, the sink device 40*a* creates the session ID when requesting the source device 30 to transmit content protected by the HDCP 2.0 for the first time, and specifies the session ID in the HTTP request header in the HTTP GET method. In this way, the session ID is shared by the source device 30 and the sink device 40*a*. However, after the authentication processing in accordance with the HDCP 2.0 is performed between the source device 30 and the sink device 40*a*, the source device 30 may specify the session ID in a HTTP response header to transfer the content in response to the HTTP GET method. In this way, the session ID may be shared by the source device 30 and the sink device 40a.

The reproduction unit 42b is a processing unit which receives and reproduces the content transferred from the source device 30. The reproduction unit 42b decrypts the encrypted copyrighted content transferred from the source device 30, using the encryption key shared in the authentication processing with the source device 30.

The display unit 43 is a screen for displaying the content reproduced by the reproduction unit 42b.

[1-2. Configuration of Hardware]

Figure 3A:
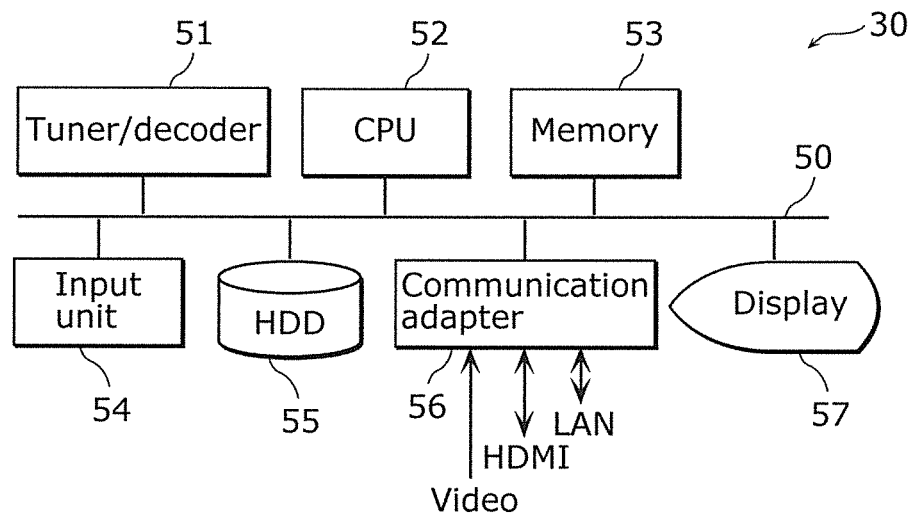
FIG. 3A illustrates an example of the hardware configuration of the source device.

FIG. 3A illustrates an example of the hardware configuration of the source device 30 illustrated in FIGS. 1 and 2. The source device 30 includes a tuner/decoder 51, a CPU 52, a memory 53, an input unit 54, a hard disk drive (HDD) 55, a communication adapter 56, and a display 57 which are interconnected by a bus 50.

The tuner/decoder 51 is a circuit which selects a digital broadcast channel and decodes broadcast content obtained by the channel selection. The CPU 52 is a processor or a one-chip microcomputer for executing a program included therein or stored in the memory 53. The memory 53 is a memory IC including a RAM and a ROM. The input unit 54 is, for example, a button for obtaining user's instruction or a remote control signal receiving circuit. The hard disk drive (HDD) 55 is an example of nonvolatile memory. The communication adapter 56 is a communication interface such as a wireless LAN, a wire LAN, and the HDMI. The display 57 is, for example, a plasma display panel (PDP) or a liquid crystal display (LCD) panel.

Here, the functional block of the source device 30 in FIG. 2 and the hardware configuration in FIG. 3A are associated in the following manner. That is, the video acquisition unit 31 in FIG. 2 is achieved by, for example, the communication adapter 56 in FIG. 3A. The control unit 32 in FIG. 2 is achieved by, for example, the CPU 52 in FIG. 3A. The memory unit 33 in FIG. 2 is achieved by at least one of the memory 53 and the HDD 55 in FIG. 3A. The communication unit 34 in FIG. 2 is achieved by, for example, the communication adapter 56 in FIG. 3A.

Figure 3B:
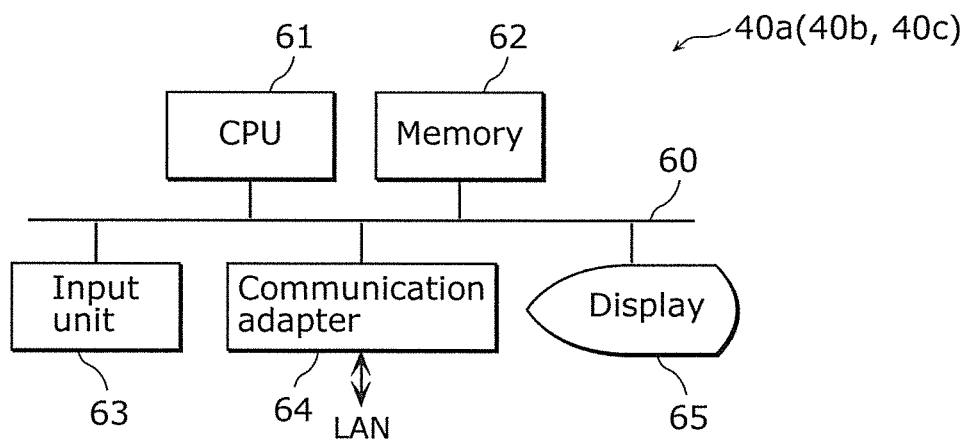
FIG. 3B illustrates an example of the hardware configuration of the sink device.

FIG. 3B illustrates an example of the hardware configuration of the sink device 40a illustrated in FIGS. 1 and 2. The sink device 40a includes a CPU 61, a memory 62, an input unit 63, a communication adapter 64, and a display 65 which are interconnected by a bus 60.

The CPU 61 is a processor or a one-chip microcomputer for executing a program included therein or stored in the memory 62. The memory 62 is a memory IC including a RAM and a ROM. The input unit 63 is, for example, a button for obtaining user's instruction or a remote control signal receiving circuit. The communication adapter 64 is a communication interface such as a wireless LAN, a wire LAN, and the HDMI. The display 65 is, for example, a PDP or a LCD panel.

Here, the functional block of the sink device 40a in FIG. 2 and the hardware configuration in FIG. 3B are associated in the following manner. That is, the communication unit 41 in FIG. 2 is achieved by, for example, the communication adapter 64 in FIG. 3B. The control unit 42 in FIG. 2 is achieved by, for example, the CPU 61 in FIG. 3B. The display unit 43 in FIG. 2 is achieved by, for example, the display 65 in FIG. 3B.

[1-3. Configuration of Software]

Figure 4:
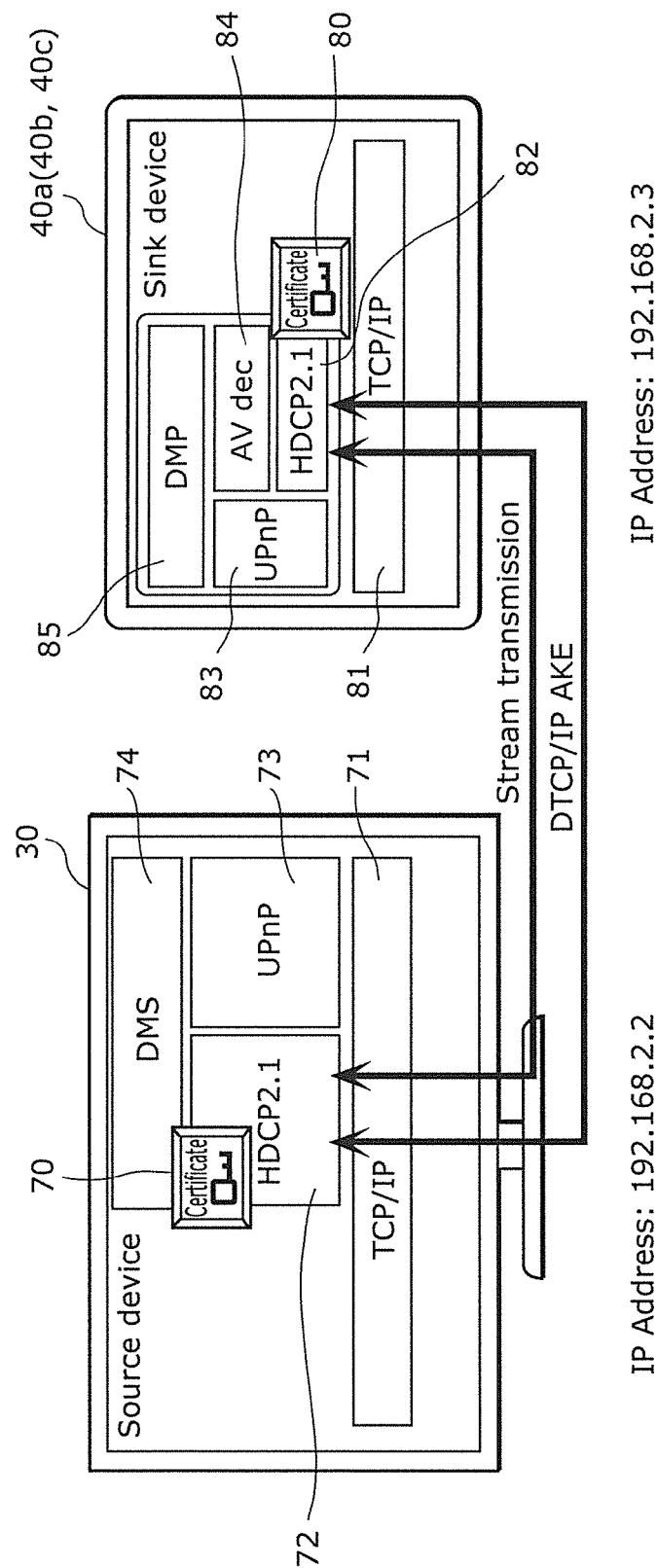
FIG. 4 illustrates an example of the software configuration of the source device and the sink device.

FIG. 4 illustrates an example of the software configuration of the source device 30 and the sink device 40a illustrated in FIGS. 1 and 2. FIG. 4 illustrates the layers of a layered communication protocol.

The source device 30 has a transmission control protocol/Internet protocol (TCP/IP) 71 as a network layer and a transport layer, an HDCP 72 (here, the HDCP 2.1) and a universal plug and play (UPnP) 73 as upper layers of the TCP/IP 71, and a DMS 74 as the uppermost application layer. It should be noted that the source device 30 has a certificate 70 indicating the validity of the source device 30 and used in authentication processing in accordance with the HDCP 72.

Each functional block of the source device 30 illustrated in FIG. 2 is achieved by the CPU 52 illustrated in FIG. 3A performing processing in accordance with the communication protocol layered as above.

Meanwhile, the sink device 40a has a TCP/IP 81 as a network layer and a transport layer, an HDCP 82 (here, the HDCP 2.1), a UPnP 83, and an AV dec 84 for decoding content as upper layers of the TCP/IP 81, and a DMP 85 as the uppermost application layer. It should be noted that the sink device 40a has a certificate indicating the validity of the sink device 40a and used in authentication processing in accordance with the HDCP 82

Each functional block of the sink device 40a illustrated in FIG. 2 is achieved by the CPU 61 illustrated in FIG. 3B performing processing in accordance with the communication protocol layered as above.

[2. Operation of System]

The following describes the operation of the content distribution system 10 in the present embodiment having the above configurations.

Figure 5:
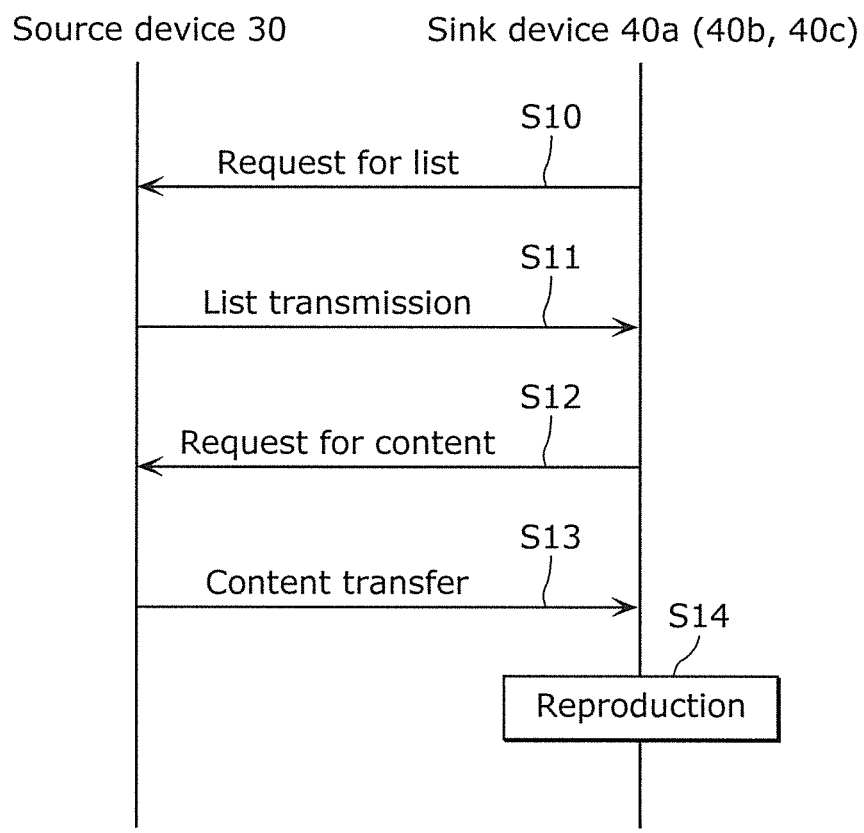
FIG. 5 is a communication sequence diagram illustrating an operation by the content distribution system.

FIG. 5 is a communication sequence diagram illustrating an operation by the content distribution system 10 in the present embodiment. FIG. 5 illustrates basic communication for distributing copyrighted content from the source device 30 to the sink device 40a.

In response to, for example, user's instruction, the control unit 42 of the sink device 40a requests the source device 30 to transmit the list of content items held by the source device 30 (list request step S10). In response to the request, the list transmission unit 32a of the source device 30 transmits, to the sink device 40a, metadata representing the list of content items held by source device 30 (list transmission step S11).

Upon receiving the metadata transmitted from the source device 30, the content request unit 42a of the sink device 40a selects a content item to be reproduced from the list of content items represented by the received metadata, in accordance with user's instruction, and requests the source device 30 to transmit the selected content item (content request step S12). In response to the request, the content transfer unit 32b of the source device 30 transfers the content requested by the sink device 40a to the sink device 40a (content transfer step S13). The content transfer unit 32b creates an encryption key by performing authentication processing on the sink device 40a in accordance with the specification of the HDCP, encrypts the content requested by the sink device 40a, using the created encryption key, and transfers the encrypted content to the sink device 40a.

The reproduction unit 42b of the sink device 40a receives and reproduces content transferred from the source device 30 (reproduction step S14). The reproduction unit 42b decrypts the encrypted copyrighted content transferred from the source device 30, using the encryption key created in the authentication processing with the source device 30, to reproduce the decrypted content.

Figure 6:
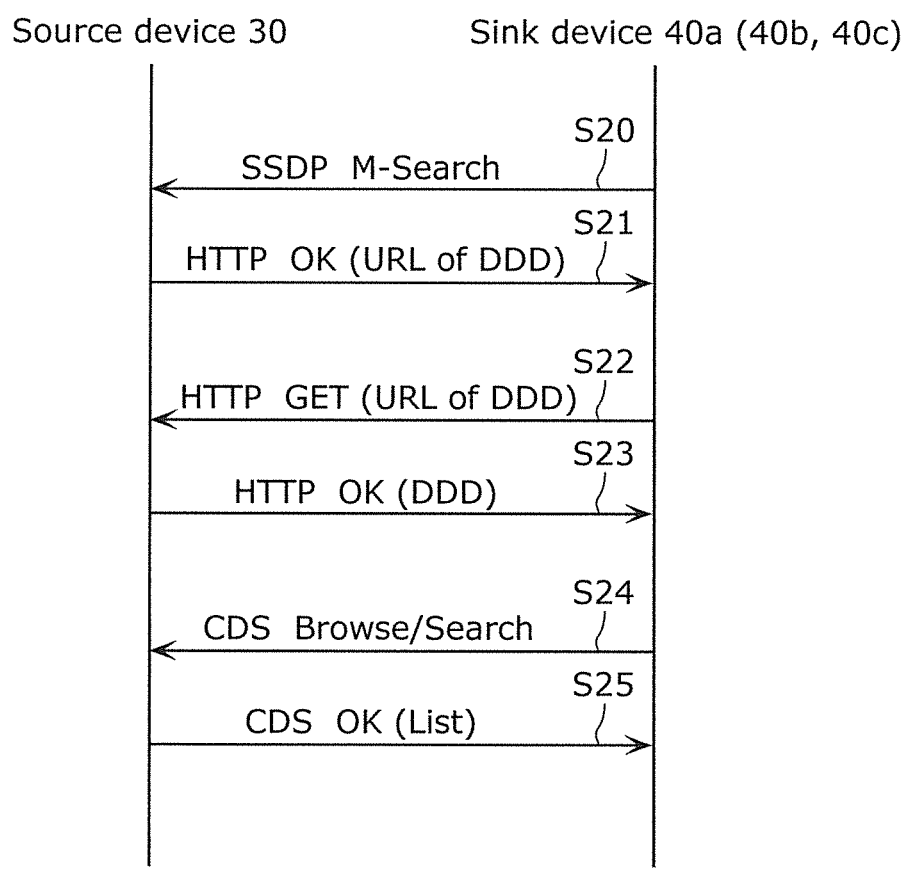
FIG. 6 is a communication sequence diagram illustrating the details of a list request step and a list transmission step in FIG. 5.

FIG. 6 is a communication sequence diagram illustrating the details of S10 (the list request step) and S11 (the list transmission step) in FIG. 5.

The sink device 40*a* multicasts a request for searching a DMS in the network 12 (M-Search) (S20). It should be noted that the M-Search is one of protocols for searching and discovering a UPnP device (simple service discovery protocol (SSDP)). Meanwhile, only the DMS sends in unicast the URL of the device information (a device description document (DDD)) to the sink device 40*a* as a reply. Here, the source device 30 sends the URL of the DDD held by the source device 30 to the sink device 40*a* as a reply (S21).

The sink device 40*a* requests the DMS (here, the source device 30) to send the DDD by notifying the DMS of the URL of the DDD using the HTTP GET method (S22). In response to the request, the DMS (here, the source device 30) sends the DDD to the sink device 40*a* as an HTTP reply (S23). For example, the name of the manufacturer and device name of the source device 30 are written in the DDD. In this way, the sink device 40*a* recognizes the source device 30 which functions as the DMS.

The sink device 40*a* sends a Browse command compliant with a content delivery service (CDS) to the source device 30 (S24). The CDS is a protocol specified in the UPnP and specifies a command capable of manipulating content held by the source device 30. For instance, the Browse command is a command for collectively obtaining content information (i.e., requesting a content list).

In response to the Browse command, the list transmission unit 32*a* of the source device 30 transmits the list of content items (a content list) stored in the memory unit 33 to the sink device 40*a* (S25 and S11 (the list transmission step) in FIG. 5). For instance, after reading the content list stored in the memory unit 33 and converting the list into metadata, the list transmission unit 32*a* transmits the metadata to the sink device 40*a*.

It should be noted that the request by the sink device 40*a* that the source device 30 should transmit the content list may be a Search command instead of the Browse command. The Search command is one of commands compliant with the CDS, and is a command for obtaining content information based on the specification of search conditions.

FIG. 7 is an example of metadata illustrating a content list transmitted in S11 (the list transmission step) in FIG. 5. That is, FIG. 7 illustrates an example of metadata created by the list transmission unit 32*a* of the source device 30. The meanings of major tags in this metadata are described below.

The description of "<item>" to "</item>" represents information on one content item. The number of the descriptions to be created corresponds to the number of content items.

"item id="video_item_1"" indicates that the item ID of this content is "video_item_1".

"parentID="AllVideo"" indicates that the parent ID of this content (e.g., the folder) is "AllVideo".

"<dc:title>documentary theater 1</dc:title>" indicates that the name of this content is "documentary theater 1".

"<dc:date>2007-05-05T19:00:00</dc:date>" indicates that this content was made at "19:00:00 on May 5, 2007".

"<res protocolInfo="http-get:*:application/x-dtcp1; . . . </res>" is a description about DTCP protection.

"<res protocolInfo="http-get:*:application/x-panahdcp2; . . . </res>" is a description about HDCP protection. More details are described below.

The following describes explanation about "protocolInfo="http-get:*:application/x-panahdcp2;CONTENTFORM AT="video/vnd.dlna.mpeg-tts":*"". "http-get" indicates that this content can be obtained in the HTTP GET method. "application/x-panahdcp2" indicates that this content is protected by the second version of the HDCP. "CONTENTFORMAT="video/vnd.dlna.mpeg-tts"" indicates that the format of this content is, for example, MPEG compliant with the DLNA guidelines.

"duration="01:09:09.645" size="7156137792">" indicates that the reproduction time of this content is "01:09:09.645" and that the size of this content is "7156137792".

"http://192.168.2.2:5555/video/video1.tts</res>" indicates information on the URL of this content.

"<upnp: class>object.item.videoItem</upnp:class>" indicates information on the UPnP.

Thus, the list transmission unit 32*a* of the source device 30 transmits metadata which includes a format identifier and a URL for a content item under the HDCP copyright protection (i.e., copyrighted content item) among the content items included in the list. The format identifier indicates that the content item is distributable under the HDCP. The URL is information indicating the place where the content item is stored.

FIG. 8 is a figure for explaining the details of S12 (the content request step) in FIG. 5. Here, FIG. 8 illustrates an example of the header of an HTTP GET method sent by the content request unit 42*a* of the sink device 40*a*. The following describes the meanings of major parameters included in this header.

"Host:92.168.2.2:5555" indicates that the IP address of a host which is a communication partner (here, the IP address of the source device 30) is "192.168.2.2" and that the port number for obtaining content is "5555".

"X-ABC-HDCP-ADDR:192.168.2.3" indicates that the IP address of a device made by ABC which communicates with other device in accordance with the HDCP (here, the sink device 40*a*) is "192.168.2.3". That is, "X-ABC-HDCP-ADDR:192.168.2.3" indicates the IP address of the device for which authentication processing is requested.

"X-ABC-HDCP-PORT:6666" indicates that the port number used when the device made by ABC (here, the sink device 40*a*) performs the authentication processing in accordance with the HDCP is "6666".

"X-ABC-HDCP-ID:002D44556600011" indicates that the session ID compliant with the HDCP performed by the device made by ABC (that is, the session ID is information uniquely identifying a session about access to the source device 30) is "002D44556600011".

Thus, when requesting copyrighted content, the content request unit 42*a* requests the source device 30 to transmit the copyrighted content, using the HTTP GET method whose header including, as information necessary for performing the authentication processing, the IP address of the sink device 40*a*, the port number of the sink device 40*a* used for performing the authentication processing in accordance with the specification of the HDCP, and a session ID which is information uniquely identifying the session about access to the source device 30.

Figure 9:
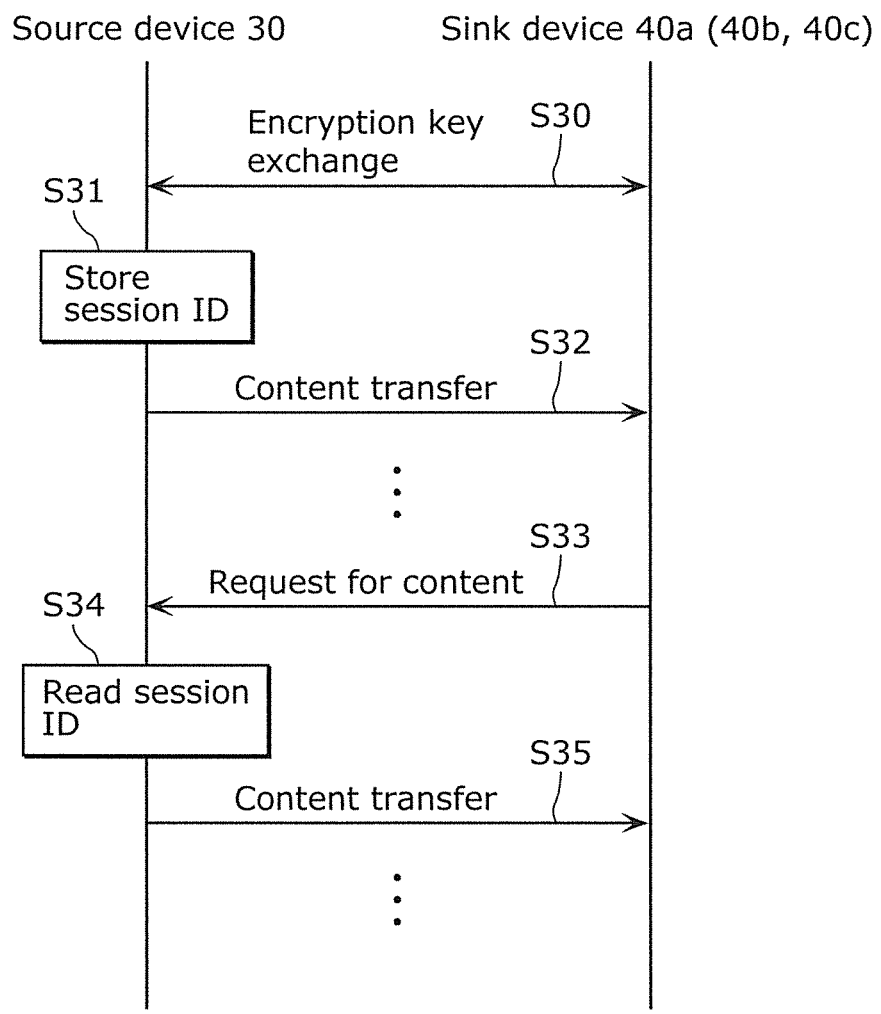
FIG. 9 is a communication sequence diagram illustrating the details of a content transfer step in FIG. 5.

FIG. 9 is a communication sequence diagram illustrating the details of S13 (the content transfer step) in FIG. 5.

The content transfer unit 32*b* of the source device 30 performs the authentication processing on the sink device 40*a* in accordance with the HDCP, using the IP address and port number of the sink device 40*a* provided by the sink device 40*a* in S12 (the content request step), and creates an encryption key used for encrypting and decrypting copyrighted content and shares the encryption key with the sink device 40*a* (authentication and key exchange (AKE) (S30)). Here, in the authentication processing, the source device 30 approves that the sink device 40*a* has the right to receive copyrighted content. The authentication processing is performed using the certificate 70 of the source device 30 and the certificate 80 of the sink device 40*a*. If the authentication processing is successful, the source device 30 and the sink device 40*a* secretly share the encryption key used for encrypting and decrypting the copyrighted content.

The content transfer unit 32*b* of the source device 30 stores, for reuse, the created encryption key and the session ID provided by the sink device 40*a* which are associated (S31).

The content transfer unit 32*b* of the source device 30 encrypts the copyrighted content requested by the sink device 40*a*, using the encryption key stored in the memory unit 33, and transfers the encrypted content to the sink device 40*a* (S32).

By performing steps S30 to S32, a response to the request for content by the sink device 40*a* (S12 (the content request step) in FIG. 5), i.e., distribution of the copyrighted content from the source device 30 to the sink device 40*a* is completed.

Here, when the sink device 40*a* fast forwards or reproduces after a pause content held by the source device 30, i.e., when the sink device 40*a* repeats obtaining the content held by the source device 30, the sink device 40*a* requests the source device 30 to transfer content which should be subsequently reproduced, according to a procedure similar to the procedure of S12 (the content request step) (S33). That is, the HTTP GET method including the header illustrated in FIG. 8 requests copyrighted content.

In response to the request, the content transfer unit 32*b* of the source device 30 determines whether or not the session ID provided by the sink device 40*a* in S33 (the content request step) matches a session ID previously stored in the memory unit 33. If the session IDs are determined to match, the content transfer unit 32*b* omits the authentication processing on the sink device 40*a* or performs less complex authentication processing (here, omits the authentication processing). It should be noted that normal authentication processing is, for example, processing called full authentication. Meanwhile, less complex authentication processing is processing called restricted authentication.

If the authentication processing is omitted, the content transfer unit 32*b* of the source device 30 reads an encryption key corresponding to the session ID from the memory unit 33 (S34), encrypts content using the read encryption key, and transfers the encrypted content to the sink device 40*a* (S35).

By so doing, if the sink device 40*a* repeats obtaining content held by the source device 30, the authentication processing (AKE) is omitted or simplified, thereby speeding up the access to the source device 30 by the sink device 40*a*.

It should be noted that if the session ID provided by the sink device 40*a* is determined not to match the session ID previously stored in the memory unit 33, the content transfer unit 32*b* of the source device 30 performs the normal authentication processing and encrypts content, to transfer the encrypted content to the sink device 40*a* (S30 to S32).

CONCLUSION

Thus, a content distribution method in the present embodiment is a content distribution method in the content distribution system 10 in which the source device 30 for transmitting content and the sink device 40*a* for reproducing the content are connected via a communication network (the network 12). The content distribution method includes: transmitting metadata from the source device 30 to the sink device 40*a*, the metadata representing a list of content items held by the source device 30 (step S11); receiving the metadata by the sink device 40*a*, and requesting, by the sink device 40*a*, a content item included in the list of content items represented by the metadata (step S12); transferring the content item requested by the sink device 40*a* from the source device 30 to the sink device 40*a* (step S13); and receiving and reproducing, by the sink device 40*a*, the content item transferred from the source device 30 (step S14). In the transmitting (S11), the source device 30 transmits the metadata which includes a format identifier and a uniform resource locator (URL) for a content item protected by a predetermined copyright protection technology, among the content items included in the list, the format identifier indicating that the content item is distributable under the copyright protection technology, the URL indicating a place where the content item is stored. In the receiving and requesting (S12), the sink device 40*a* makes a request for a content item identified by the URL, the request including information necessary for performing authentication processing. In the transferring (S13), the source device 30 creates an encryption key by performing the authentication processing on the sink device 40*a* in accordance with the information necessary for performing the authentication processing, encrypts the content item requested by the sink device 40*a* using the encryption key, and transfers the encrypted content item to the sink device 40*a*. In the receiving and reproducing (S14), the sink device 40*a* decrypts the encrypted content item transferred from the source device 30, using the encryption key created in the authentication processing by the source device 30, to reproduce a decrypted content item.

Thus, the metadata representing the content list transmitted from the source device to the sink device includes a format identifier and a URL for a content item protected by a predetermined copyright protection technology such as the HDCP. Here, the format identifier indicates that the content item is distributable under the copyright protection technology. The URL is information indicating the place where the content item is stored. Therefore, the sink device can make a request for a content item identified by the URL after adding information necessary for authentication processing to the request. The source device can create encryption key by performing the authentication processing on the sink device in accordance with the information necessary for the authentication processing transmitted from the sink device, encrypt the content item requested by the sink device, using the created encryption key, and transfer the encrypted content item to the sink device. This allows the source device to safely distribute copyrighted content to the sink device in response to the request from the sink device as a trigger.

Moreover, in the present embodiment, in the receiving and requesting (S12), the sink device 40*a* requests the content item using a GET method in the HTTP, the GET method including, in a header thereof, as the information necessary for performing the authentication processing, an IP address of the sink device 40*a*, a port number of the sink device 40*a* used for performing the authentication processing, and a session ID which is information uniquely identifying a session about access to the source device 30. In the transferring (S13), the source device 30 performs the authentication processing on the sink device 40*a*, using the IP address and the port number of the sink device 40*a*, which are provided by the sink device 40*a*, and associates and stores the encryption key and the session ID provided by the sink device 40*a*.

Thus, the sink device requests the source device to transmit the content item, using a HTTP GET method whose header includes the IP address of the sink device, the port number of the sink device used for performing the authentication processing, and the session ID. This allows the source device to perform the authentication processing on the sink device, using the IP address and the port number of the sink device, which are provided by the sink device, and to store the created encryption key and the session ID provided by the sink device which are associated.

Moreover, in the transferring (S13), if the session ID provided by the sink device 40a in the receiving and requesting (S12) matches a session ID previously held by the source device 30, the source device 30 omits the authentication processing on the sink device 40a or performs authentication processing less complex than the authentication processing, and transfers the encrypted content item to the sink device 40a.

Thus, if the source device receives the request for content from the sink device by a HTTP GET method including the same session ID, the source device can encrypt the content using the previously held encryption key corresponding to the session ID. This allows the second or later authentication processing to be simplified or omitted, thereby speeding up content transfer.

Moreover, in the present embodiment, the source device 30 and the sink device 40a respectively function as a server and a client compliant with a home network protocol, and the copyright protection technology prevents a content item from being illegally copied, by encrypting the content item using the encryption key created in the authentication processing and transferring the encrypted content item from the source device 30 to the sink device 40a. More specifically, the source device 30 and the sink device 40a respectively function as a DMS and a DMP compliant with DLNA guidelines, and the copyright protection technology is HDCP.

This allows the DMS (the source device in the present embodiment) to safely distribute copyrighted content to the DMP (the sink device in the present embodiment) in accordance with the specification of the HDCP, in response to the request from the DMP compliant with the DLNA guidelines.

A content distribution method, a content distribution system, a source device, and a sink device in the present disclosure are described above based on the embodiment. However, the present disclosure is not limited to the embodiment. The present disclosure also includes an embodiment achieved by making various changes to the embodiment or another embodiment created by combining the structural elements in the embodiment unless the embodiment does not depart from the scope of the present disclosure.

For instance, in the communication sequence illustrated in FIG. 5, the source device 30 transmits a content list to the sink device 40a in response to the request from the sink device 40a. However, even if the sink device 40a does not request the content list, the source device 30 may transmit the content list to the sink device 40 (e.g., at regular time intervals).

Moreover, S35 (second or later content transfer) illustrated in FIG. 9 is an example of omission of the authentication processing. If the session ID received from the sink device 40a matches the session ID previously held by the source device 30, the content transfer unit 32b of the source device 30 may perform simple authentication processing and transfer subsequent content to the sink device 40a, using a new encryption key created in the simple authentication processing.

Moreover, the hardware configurations illustrated in FIGS. 3A and 3B illustrate representative hardware configurations. Thus, other structural elements not illustrated in the figures may be added to the hardware configurations of the source device 30 and the sink device 40a. For instance, the sink device 40a may include, for example, a tuner/decoder and an HDD.

INDUSTRIAL APPLICABILITY

The content distribution method in the present disclosure is applicable to a source device for transmitting content, a sink device for reproducing the content, and a content distribution system including the source device and the sink device. The content distribution system is, for example, a content distribution system which can safely distribute copyrighted content in various forms in accordance with the specification of the HDCP.

REFERENCE SIGNS LIST 10 content distribution system
12 network
20 antenna
22 STB
24 disc reproduction device
30 source device
31 video acquisition unit
32 and 42 control unit
32a list transmission unit
32b content transfer unit
33 memory unit
34 and 41 communication unit
40a, 40b, and 40c sink device
42a content request unit
42b reproduction unit
43 display unit
50 and 60 bus
51 tuner/decoder
52 and 61 CPU
53 and 62 memory
54 and 63 input unit
55 HDD
56 and 64 communication adapter
57, 65 display
70, 80 certificate
71 and 81 TCP/IP
72 and 82 HDCP
73 and 83 UPnP
74 DMS
84 AV dec
85 DMP

The invention claimed is:

1. A source device in a content distribution system including the source device for transferring content and a sink device for reproducing the content which are connected via a communication network, the source device comprising:
a list transmission unit configured to transmit, to the sink device, metadata representing a list of content items held by the source device; and
a content transfer unit configured to transfer a content item requested by the sink device to the sink device,
wherein the list transmission unit is configured to transmit the metadata which includes a format identifier and a uniform resource locator (URL) for a content item protected by a predetermined copyright protection technology, among the content items included in the list, the format identifier indicating that the content item is distributable under the copyright protection technology, the URL indicating a place where the content item is stored, the content transfer unit is configured to create an encryption key by performing authentication processing on the sink device in accordance with information necessary for performing the authentication processing, which is received from the sink device, encrypt the content item requested by the sink device using the encryption key, and transfer the encrypted content item to the sink device.

2. A sink device in a content distribution system including a source device for transferring content and the sink device for reproducing the content which are connected via a communication network, the sink device comprising:

a content request unit configured to receive, from the source device, metadata representing a list of content items held by the source device, and request a content item included in the list of content items represented by the metadata; and a reproduction unit configured to receive and reproduce the content item transferred from the source device, wherein the metadata includes a format identifier and a uniform resource locator (URL) for a content item protected by a predetermined copyright protection technology, among the content items included in the list, the format identifier indicating that the content item is distributable under the copyright protection technology, the URL indicating a place where the content item is stored, the content request unit is configured to make a request for a content item identified by the URL, the request including information necessary for performing authentication processing with the source device, and the reproduction unit is configured to decrypt an encrypted content item transferred from the source device, using an encryption key created in the authentication processing with the source device, to reproduce a decrypted content item.

3. A transferring method in a content distribution system in which a source device for transferring content and a sink device for reproducing the content are connected via a communication network, the transferring method comprising:

transmitting metadata from the source device to the sink device, the metadata representing a list of content items held by the source device; and transferring a content item requested by the sink device from the source device to the sink device;

wherein in the transmitting, the source device transmits the metadata which includes a format identifier and a uniform resource locator (URL) for a content item protected by a predetermined copyright protection technology, among the content items included in the list, the format identifier indicating that the content item is distributable under the copyright protection technology, the URL indicating a place where the content item is stored, and in the transferring, the source device creates an encryption key by performing authentication processing on the sink device in accordance with information necessary for performing the authentication processing, which is received from the sink device, encrypts the content item requested by the sink device using the encryption key, and transfers the encrypted content item to the sink device.

4. A reproducing method in a content distribution system in which a source device for transferring content and a sink device for reproducing the content are connected via a communication network, the reproducing method comprising:

receiving, by the sink device, metadata transmitted from the source device, the metadata representing a list of content items held by the source device;

requesting, by the sink device, a content item included in the list of content items represented by the metadata; and receiving and reproducing, by the sink device, the content item transferred from the source device, wherein the metadata includes a format identifier and a uniform resource locator (URL) for a content item protected by a predetermined copyright protection technology, among the content items included in the list, the format identifier indicating that the content item is distributable under the copyright protection technology, the URL indicating a place where the content item is stored, in the requesting, the sink device makes a request for a content item identified by the URL, the request including information necessary for performing authentication processing with the source device, and in the receiving and reproducing, the sink device decrypts an encrypted content item transferred from the source device, using an encryption key created in the authentication processing with the source device, to reproduce a decrypted content item.

* * * * *